Jan. 3, 1928.
C. E. RECORDS ET AL
1,654,601
WELL STRAINER
Filed Aug. 22, 1925
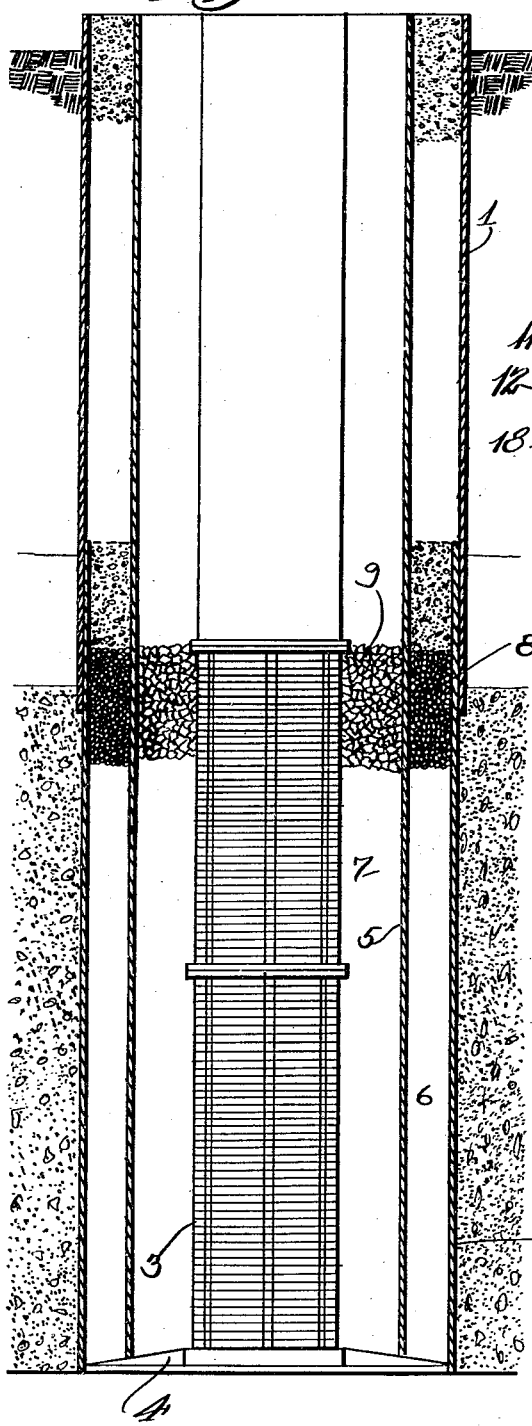
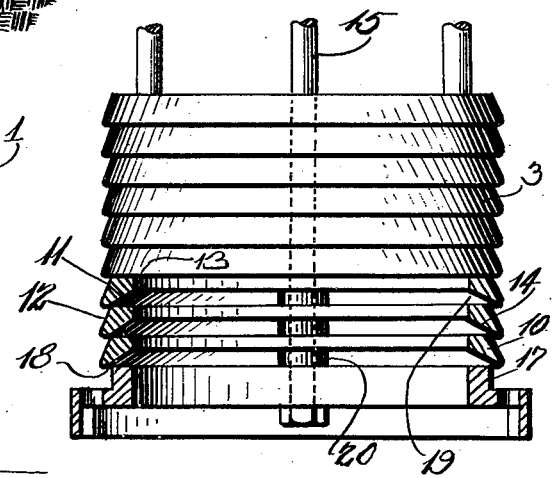
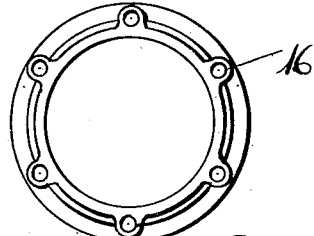
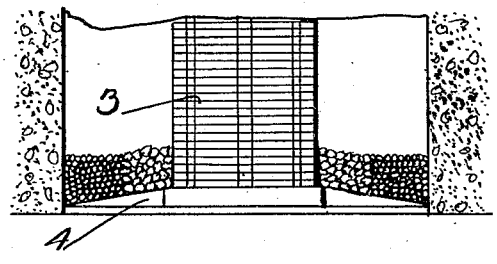
INVENTORS.
Chester E. Records,
Reuben R. Schweitzer
ATTORNEYS.

Patented Jan. 3, 1928.

1,654,601

UNITED STATES PATENT OFFICE.

CHESTER E. RECORDS, OF ANDERSON, INDIANA, AND REUBEN R. SCHWEITZER, OF WYOMING, OHIO.

WELL STRAINER.

Application filed August 22, 1925. Serial No. 51,820.

This invention relates to a method of well construction, and to a particular strainer adapted for use in such well construction.

It has been heretofore proposed in well constructions to provide an artificial restraining wall or layer about the strainer to prevent the natural gravel and sand entering the strainer with the water, and this artificial restraining wall has been constructed of a body of natural or artificial elements substantially or approximately spherical interposed between the strainer proper and the natural water bearing formation. This artificial filtering layer or wall has been heretofore introduced between the screen proper and the water bearing formation in a manner which did not and could not insure that the disposition of such filtering wall would be of approximately uniform depth or thickness about the strainer, with the result that the filtering effect of such layer was not as effective as could be desired. That is to say such filtering media was applied about the screen and lowered with the latter, as the material was dredged from the well. The contemplated action of the water bearing material falling away from around the screen as it was dredged from below the screen, to afford a passage for the filtering media has proven somewhat unsatisfactory as this action was not always uniform and might tend to fill up around the screen for a portion of the length of the latter, with the result that as completed the filtering media might or might not entirely surround the screen and at best would be practically certain to be of greater thickness at some points than at others.

The principal object of the method of well construction of the present application is the utilization of certain steps of procedure which will insure that the filtering media, that is the loose spherical elements employed would completely circle the screen in a wall of uniform thickness, so that substantially complete filtration could be provided for by the character of the elements employed and the thickness of the layer of such elements.

Another object of the present invention is that in the method of well construction employed it is possible to provide an outer filtration layer of sufficient fineness to hold back the sand and other impurities in suspension in the water, and an inner layer of coarser materials to hold back the finer materials while being of a size to prevent entrance into the screen proper. The method employed in this application permits the disposition of the separate layers of different sized filtering elements in proper relative dispositions, of uniform thickness throughout, and as a completely encircling wall about the screen proper.

A further object of the present invention is the provision of a screen proper made up of separate similar units having such edge construction as to afford free entrance to the water in the maximum degree, without possibility of choking or filling at any point, with the units assembled and secured together to leave the interior area between such elements absolutely free of obstruction, in order that effective cleaning may be readily carried out.

The invention is illustrated in the accompanying drawings in which:—

Fig. 1 is a sectional view illustrative of the method of well construction of the present invention.

Fig. 2 is a view in elevation partly in section of the screen proper.

Fig. 3 is a top plan of one of the sections of the screen.

Fig. 4 is a sectional view showing the final arrangement of filtering media.

In carrying out the method of well construction a permanent casing 1 is lowered in the well opening to that depth requisite to prevent surface drainage into the well, as is usually required in all well constructions of this character. A temporary casing 2 of a size to slidably fit with the casing 1 is then lowered within said casing and to the required depth below said casing 1, as the material is removed from the well opening by any of the usual dredging or suction methods. The screen proper 3 is then lowered within the well opening to approximately the upper end of the temporary casing 2, the base 4 forming part of the screen proper being of a diameter slightly less than that of the temporary casing 2. A second permanent casing 5 of less diameter than that of the casing 1 is lowered into the well opening and rests upon the base 4 of the screen proper. The space 6 between the permanent casings 1 and 5 is then filled with filtering media of the desired fineness, other filtering media of coarser character being introduced into the space 7 between the permanent casing 5 and the screen proper. The finer filtering media indicated at 8 is thus arranged in an annular layer or wall about the coarser filtering media indicated at 9, and the latter is disposed in an annular layer or wall about the screen proper. Through the utilization of the casings as described, it will be apparent that the required thicknesses of these respective filtering layers may be regulated as desired, but whatever the thickness it will be absolutely uniform at all points. The screen carrying the permanent casing 5 is lowered to the bottom of the well, following which the temporary casing 2 is removed, leaving the filtering wall of finer material exposed to the water bearing formation; the permanent casing 5 is moved upwardly until its lower edge is approximately at the lower edge of the permanent casing 1, and the space between the permanent casings 1 and 5 is filled with cement.

As a result of this method of construction the filtering media is a completely surrounding protective agent between the water bearing formation and the screen proper, the finer filtering media holding back the natural water bearing sand or gravel, and the coarser filtering media holding back the finer filtering media. A particular advantage of the method employed is the possibility of thereby placing the respective filtering media with absolute precision at the places desired, while at the same time insuring that such filtering media shall be of uniform desired thickness at any point and all points in the protective wall thus affording a material advantage over methods heretofore employed, wherein the exact disposition of the filtering media or its thickness at any one point was at best problematical.

It is of course to be understood that with the particular method here described any requisite number of layers of filtering media may be employed, the two such layers indicated being merely illustrative. Of course with additional layers additional casings would be employed, the use and application of which will be perfectly obvious from the above description.

The screen proper, shown in Figs. 2 and 3 is made up of separate units comprising an annular rim 10 having a square upper surface 11 and outwardly and downwardly flaring edge 12 an inner margin 13 at right angles to the upper surface 11 and a bottom edge 14 which is downwardly and outwardly inclined at a somewhat less angle to the horizontal than the outer edge 12. The units are assembled in superimposed relation and held in such position by bolts 15 which extend through bosses 16 which are arranged wholly beyond the upper edge 11 of the unit, so that the space between the upper edge 11 of one unit and the inclined lower edge 14 of the next higher unit is wholly free of obstruction, thus providing for the maximum inflow of water, and at the same time permitting a ready cleaning of this area, for example by a brush introduced into the screen.

The screens are preferably made in sections and the bottom of one section may be provided with a coupling member 17, to connect that section with a similar coupling member on the upper end of the lower section. Any desired number of sections may be thus secured together. The lower end of the screen proper is provided with a base 4 heretofore referred to, while the superimposed sections are coupled together as described.

It will be plain from the description of the screen proper that the lower edge or face of each screen unit projects beyond the outer edge of the upper surface 11 of the next lower unit, thus providing a pocket 18 on the outer side of the screen between each of the units. The flat face 11 of each unit provides with the inclined face 14 of the next superimposed unit a water passage 19 between the units which is inwardly divergent, that is increase in size in the direction of flow of the water.

This particular screen unit formation is important, for it will be apparent that this screen is surrounded by the coarser filtering media 9 and of course such media cannot pass through the water entrance between the units. The filtering material immediately adjacent the unit which is naturally subjected to movement under the flow of the water will move into and out of the pockets 18, thus tending to clear these pockets, and keep them free for water admission. If by any possibility any foreign substances should pass through the openings into the screen proper, the increasing size of the water passage 19 will permit ready clearance of such foreign particles as they move inwardly with the water.

The screen units are spaced apart to provide an annular entrance space between the pockets and water passages, and this spacing of the units may of course be arranged as desired in a particular instance. For ordinary usages the bosses 16 may be integrally thickened as at 20 to provide for the conventional or minimum spacing of the units. Any additional spacing may be readily provided by placing ordinary washers of the desired thickness about the bolts 15 between the bosses.

The filtering media should preferably be perfect spheres, as such provide the minimum contact one with the other and yet afford absolutely uniform spaces between them. Thus it is contemplated that manufactured elements of any appropriate vitrified composition, and of the requisite diameter may be employed for the filtering media, though it is to be understood that natural stones selected with a view to their substantially spherical shape and proper diameter may be employed.

The screen elements are preferably constructed of cast iron or cast bronze metal, and by reason of the shape and type of construction, a material increase in rigidity over other types of similar section is secured. The units may of course be made of various shapes.

What is claimed as new is:

1. A screen unit for well construction, comprising annular members spaced apart and having flat upper surfaces, lower surfaces which are inclined downwardly and outwardly relative to the upper surfaces and terminate on a peripheral line radially beyond the peripheral outer edge of the upper surface, and means disposed wholly beyond the flat upper surface for spacing the annular members relative to each other.

2. A screen unit for use in well construction, comprising a series of superimposed similar members to be spaced apart to form passages for the liquid to be strained, each member being in the form of an annular ring with the upper surface flat and at right angles to the axis of the member, the lower surface downwardly and outwardly inclined with respect to the upper surface and the outer edge surface outwardly inclined with respect to the upper surface, the said lower surface being of greater width than the upper surface and intercepting the outer edge surface at a point radially beyond the marginal edge of the upper surface.

3. A screen unit for use in well construction, comprising a series of superimposed similar members, each member being in the form of an annular ring with the upper surface flat and at right angles to the axis of the member, the lower surface downwardly and outwardly inclined with respect to the upper surface and the outer edge surface outwardly inclined with respect to the upper surface, the said lower surface being of greater width than the upper surface and intercepting the outer edge surface at a point radially beyond the marginal edge of the upper surface, and means arranged between the members to permit their assemblage in unit form with the lower surface of each member spaced from and extending radially beyond the outer edge of the upper surface of the next lower member, whereby said lower surface of each member forms a pocket with the edge surface of the next lower member.

4. A screen unit for use in well construction, comprising a series of superimposed similar members, each member being in the form of an annular ring with the upper surface flat and at right angles to the axis of the member, the lower surface downwardly and outwardly inclined with respect to the upper surface and the outer edge surface outwardly inclined with respect to the upper surface, the said lower surface being of greater width than the upper surface and intercepting the outer edge surface at a point radially beyond the marginal edge of the upper surface, and means arranged between the members to permit their assemblage in unit form with the lower surface of each member spaced from and extending radially beyond the outer edge of the upper surface of the next lower member, whereby said lower surface of each member forms a pocket with the edge surface of the next lower member, said spacing means being arranged wholly and outwardly beyond the flat upper surface of each member, whereby the space between the units is uninterrupted throughout the full contour of the unit.

In testimony whereof we affix our signatures.

CHESTER E. RECORDS.
REUBEN R. SCHWEITZER.